(12) United States Patent
Eschenbeck et al.

(10) Patent No.: US 11,584,214 B2
(45) Date of Patent: Feb. 21, 2023

(54) PIPING, DRIVE TRAIN UNIT COMPRISING SUCH A PIPING, AND INSTALLATION METHOD

(71) Applicant: ZF Friedrichshafen AG, Friedrichshafen (DE)

(72) Inventors: Linus Eschenbeck, Wangen (DE); Leschek Debernitz, Eriskirch (DE); Andreas Knörle-Philipp, Ravensburg (DE); Julia Baumann, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 249 days.

(21) Appl. No.: 16/918,393

(22) Filed: Jul. 1, 2020

(65) Prior Publication Data

US 2021/0001704 A1 Jan. 7, 2021

(30) Foreign Application Priority Data

Jul. 2, 2019 (DE) .................... 10 2019 209 672.7

(51) Int. Cl.
| | |
|---|---|
| *B60K 6/36* | (2007.10) |
| *B60K 6/24* | (2007.10) |
| *B60K 6/26* | (2007.10) |
| *H02K 7/10* | (2006.01) |
| *F16J 15/06* | (2006.01) |
| *H02K 1/20* | (2006.01) |
| *F16H 57/04* | (2010.01) |

(52) U.S. Cl.
CPC .................. *B60K 6/36* (2013.01); *B60K 6/24* (2013.01); *B60K 6/26* (2013.01); *F16H 57/0423* (2013.01); *F16J 15/062* (2013.01); *H02K 1/20* (2013.01); *H02K 7/10* (2013.01)

(58) Field of Classification Search
None
See application file for complete search history.

(56) References Cited

U.S. PATENT DOCUMENTS

| | | | | |
|---|---|---|---|---|
| 9,068,679 | B2 * | 6/2015 | Nakata | ..................... F16L 23/18 |
| 2021/0071750 | A1 * | 3/2021 | Ringstein | ............. F16H 57/0472 |

FOREIGN PATENT DOCUMENTS

| | | | | |
|---|---|---|---|---|
| CN | 202901601 U | * | 4/2013 | |
| CN | 202901605 U | * | 4/2013 | |
| CN | 103807527 A | * | 5/2014 | .............. F16L 21/00 |

(Continued)

OTHER PUBLICATIONS

Details_Home.pdf (Year: 2016).*

(Continued)

*Primary Examiner* — Dirk Wright
(74) *Attorney, Agent, or Firm* — Dority & Manning, P.A.

(57) ABSTRACT

A piping (1) for guiding a fluid within a drive train unit (G) of a motor vehicle includes a pipe (R). A stop (R1A) is formed at a first end (R1) of the piping (1). A sealing element (R2D) is provided at a second end (R2) of the piping (1). The sealing element (R2D) acts as an axial seal. In order to improve a sealing effect of the sealing element (R2D), the piping (1) is loaded along an extension direction of the piping (1). A drive train unit (G) for a motor vehicle including such a piping (1) and a method for installing such a piping (1) into such a drive train unit (G) is also provided.

14 Claims, 4 Drawing Sheets

(56) References Cited

FOREIGN PATENT DOCUMENTS

| CN | 103807545 | A | * | 5/2014 | ............. F16J 15/061 |
|----|-----------|---|---|--------|---------------------------|
| CN | 103807547 | A | * | 5/2014 | ............. F16L 43/00 |
| CN | 103807550 | A | * | 5/2014 | ............. F16J 15/061 |
| CN | 207830783 | U | * | 9/2018 | |
| CN | 207830792 | U | * | 9/2018 | ............. F16L 33/20 |
| CN | 109477600 | A | * | 3/2019 | ............. F16J 15/062 |
| DE | 102011076904 | A1 | * | 12/2012 | ............. H02K 1/146 |
| DE | 102014015400 | A1 | * | 4/2015 | ............. F16H 57/04 |
| DE | 102014015400 | A1 | | 4/2015 | |

OTHER PUBLICATIONS

Tube_End_Forming_Details.pdf (Year: 2014).*
Parker_TechSeal_Lathe_Cut_Press-ih-Place_Seals_TSD-5434.pdf (Year: 2012).*

* cited by examiner

PIPING, DRIVE TRAIN UNIT COMPRISING SUCH A PIPING, AND INSTALLATION METHOD

CROSS-REFERENCE TO RELATED APPLICATION

The present application is related and has right of priority to German Patent Application No. 10 2019 209 672.7 filed on Jul. 2, 2019, which is incorporated by reference in its entirety for all purposes.

FIELD OF THE INVENTION

The invention relates generally to a piping for guiding a fluid within a drive train unit of a motor vehicle. The invention further relates generally to a drive train unit including such a piping and to a method for installing such a piping in this type of drive train unit.

BACKGROUND

DE 10 2014 01 5 400 A1 describes a line arrangement for a motor vehicle, wherein a line element formed from plastic, separately from the housing, is provided in order to form a channel between two housing openings for fitting. A stop in the form of an annular collar is provided at one of the end areas of the line element, with the aid of which the line element is supported in the axial direction. Recesses for O-rings are also arranged in the end areas, in order to seal the line element with respect to the housing.

In this type of design, it is difficult to reliably position the line element between the openings for fitting, so that the end areas, including the O-rings, can be introduced, true to size, into the openings for fitting. This applies, in particular, to a concealed installation, in which the line element is not visible during the installation process and cannot be guided.

SUMMARY OF THE INVENTION

One problem addressed by example aspects of the invention is that of providing a piping, which is suitable for a concealed installation in a drive train unit. A second example problem is that of providing an appropriate installation method for installing such a piping in a drive train unit.

A piping is provided for guiding a fluid within a drive train unit. The drive train unit can be, for example, an internal combustion engine, a hybrid module, a transmission for providing multiple gear steps, or an electrical axle drive. The piping includes a pipe, wherein a stop is formed at a first end of the piping. A sealing element is provided at a second end of the piping.

According to example aspects of the invention, the sealing element acts as an axial seal, wherein, in order to improve a sealing effect of the sealing element, the piping is loaded along an extension direction of the piping. In contrast to a radial seal, an axial seal does not act around the perimeter of a component, but rather via a contact between two planar surfaces. Such a contact is also easier to establish in the case of a concealed installation without visual contact of the surfaces than the insertion of an outer diameter of a pipe into an inner diameter of a pipe receptacle. In order to ensure the sealing effect of such an axial seal, a preload force is necessary, which presses a sealing surface of the sealing element against a complementary surface. This preload force can be achieved, in an easy way, via a preload of the piping, in that the piping is loaded along an extension direction of the piping.

Preferably, the sealing element is secured at the second end of the piping with the aid of a seal holding element. The seal holding element itself is secured at the pipe. Due to such an approach, the sealing element acting as an axial seal can be well secured at the pipe, so that an undesirable kinking of the sealing element does not occur.

Preferably, the sealing element is secured at the seal holding element in a form-locking manner. As a result, an undesirable detachment of the sealing element from the seal holding element can be prevented in an easy way, in particular before the installation of the piping in the drive train unit.

According to one preferred example embodiment, a radially outwardly directed groove is provided at an inner diameter of the seal holding element. Radially outwardly directed protuberances are provided at the sealing element. The direction "radially outward" relates to the seal holding element and to the sealing element itself, which preferably have an essentially circularly symmetric shape. The protuberances and the groove cooperate, so that the sealing element is secured at the seal holding element with the aid of the protuberances and the groove.

Preferably, the pipe is constructed of metal, preferably of steel. Due to such a material selection, a particularly thin-walled structure is possible, so that the pipe can also be utilized in confined space conditions.

Preferably, the stop is formed directly from the material of the pipe, for example, with the aid of a local belling of the pipe. Such an integral embodiment of the stop is easily manufactured and reduces the number of parts of the piping.

The pipe of the piping is preferably bent. Due to such a shape, the elasticity of the piping can be improved, so that the sealing effect of the sealing element is improved.

The piping can be an integral part of a drive train unit of a motor vehicle. The piping is configured for guiding a fluid within a housing of the drive train unit. The piping is well suited for a use within the housing due, in particular, to the suitability for the concealed installation.

If the drive train unit is formed by a transmission, the piping can be arranged, at least partially or in sections, between the housing and a torque converter of the transmission. In this way, a targeted guidance of the fluid past the torque converter can be achieved, without the need to provide a complex channel structure within the housing.

Preferably, the piping is utilized for guiding fluid from the housing or from a housing plate connected to the housing to a component of an electric machine arranged within the housing, preferably to a stator carrier of the electric machine. The piping is particularly well suited for such an application, since a stator, including the stator carrier, generally has a cylindrical shape. If the stator carrier is now to be installed, starting from a face end of the stator, and if the piping is arranged on the opposite face end, the interface between the piping and the stator carrier is often not visible during the installation, so that a concealed installation is necessary. The provided design is particularly suitable precisely for such an application.

In order to solve the second example problem, an installation process of a piping, described at the outset, in a drive train unit is provided, wherein the process is characterized by the following:

securing the piping with respect to the housing of the drive train unit by inserting the first end of the piping into an opening on the housing side until the stop at the first end of the piping acts against a stop surface on the housing side;

inserting the stator carrier of the electric machine into the housing, so that a fluid interface of the stator carrier contacts the sealing element of the piping; and continuing the insertion movement of the stator carrier, so that the piping is elastically deformed.

Due to such an installation process, a preload force is exerted onto the sealing element of the piping in an easy way, namely by the installation process itself, so that the sealing effect between the sealing element the fluid interface at the stator carrier is enhanced.

BRIEF DESCRIPTION OF THE DRAWINGS

One exemplary embodiment of the invention is described in detail in the following in the figures and the associated description. Wherein.

DETAILED DESCRIPTION

Figure 1:
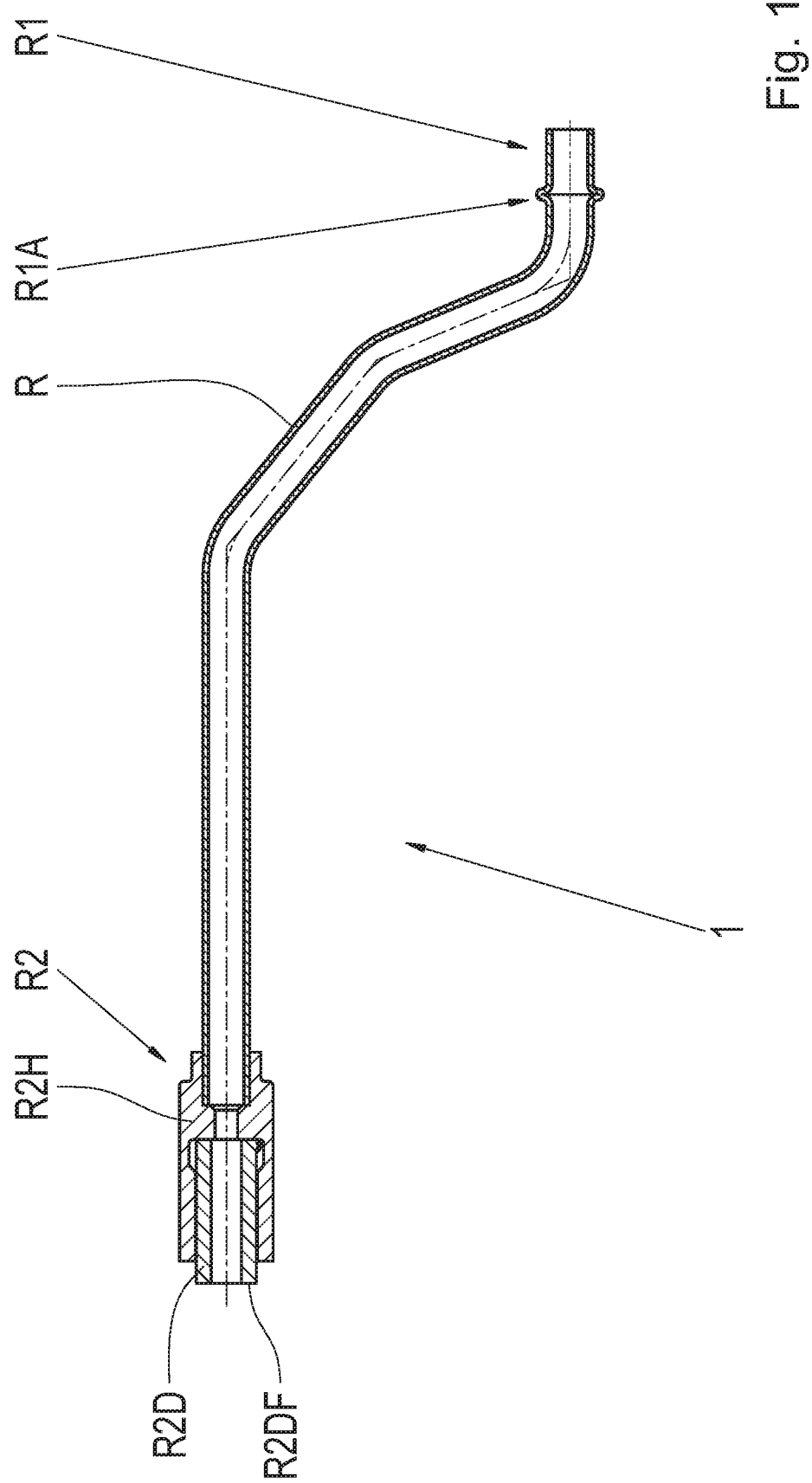
FIG. 1 and FIG. 2 each show a sectional view of a piping according to example aspects of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a sectional view of a piping 1. The piping 1 includes a metallic pipe R including a first end R1 and a second end R2. The pipe R is bent at several points. A stop R1A is formed at the first end R1, in this case, by way of example, by a local belling of the pipe R, directly from the material of the pipe R. A sealing element R2D is provided at the second end R2. The sealing element R2D is secured at the second end R2 with the aid of a seal holding element R2H.

The sealing element R2D is constructed, for example, of an elastomer, and acts as an axial seal. In contrast to a radial seal, an axial seal does not act around the perimeter of a component, but rather via a contact between two planar surfaces. The planar surface, on the seal side, of the sealing element R2D is marked as R2DF in FIG. 1. In order to ensure the sealing effect of such an axial seal, a preload force is necessary, which presses the sealing surface R2DF of the sealing element R2D against a complementary surface. This preload force can be achieved, in an easy way, via a preload of the piping 1, in that the piping 1 is loaded along an extension direction of the piping 1.

Figure 2:
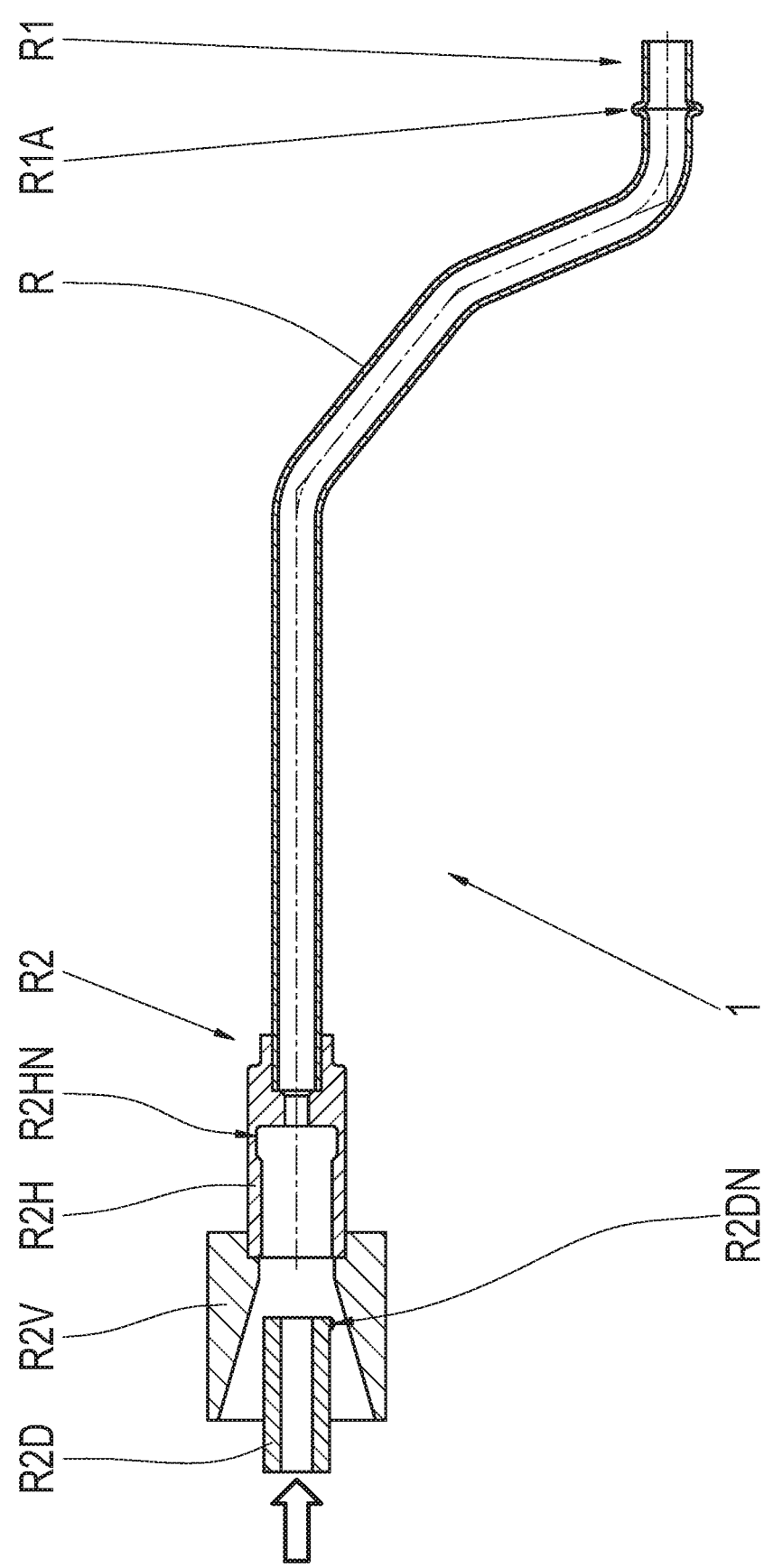

FIG. 2 shows one further sectional view of the piping 1. The manner in which the sealing element R2D is secured on the seal holding element R2H is represented in FIG. 2. A radially outwardly directed groove R2HN is provided at an inner diameter of the seal holding element R2H. Radially outwardly directed protuberances R2DN are provided at the sealing element R2D, wherein only one of the protuberances R2DN is visible in the sectional view according to FIG. 2. An assembly sleeve R2V is provided for installing the sealing element R2D at the seal holding element R2H. The sealing element R2D is inserted, through an opening of the assembly sleeve R2V, into an opening of the seal holding element R2H until the protuberances R2DN engage into the groove R2HN. Therefore, the sealing element R2D is secured at the seal holding element R2H in a form-locking manner. Thereafter, the assembly sleeve R2V can be removed again.

Figure 3:
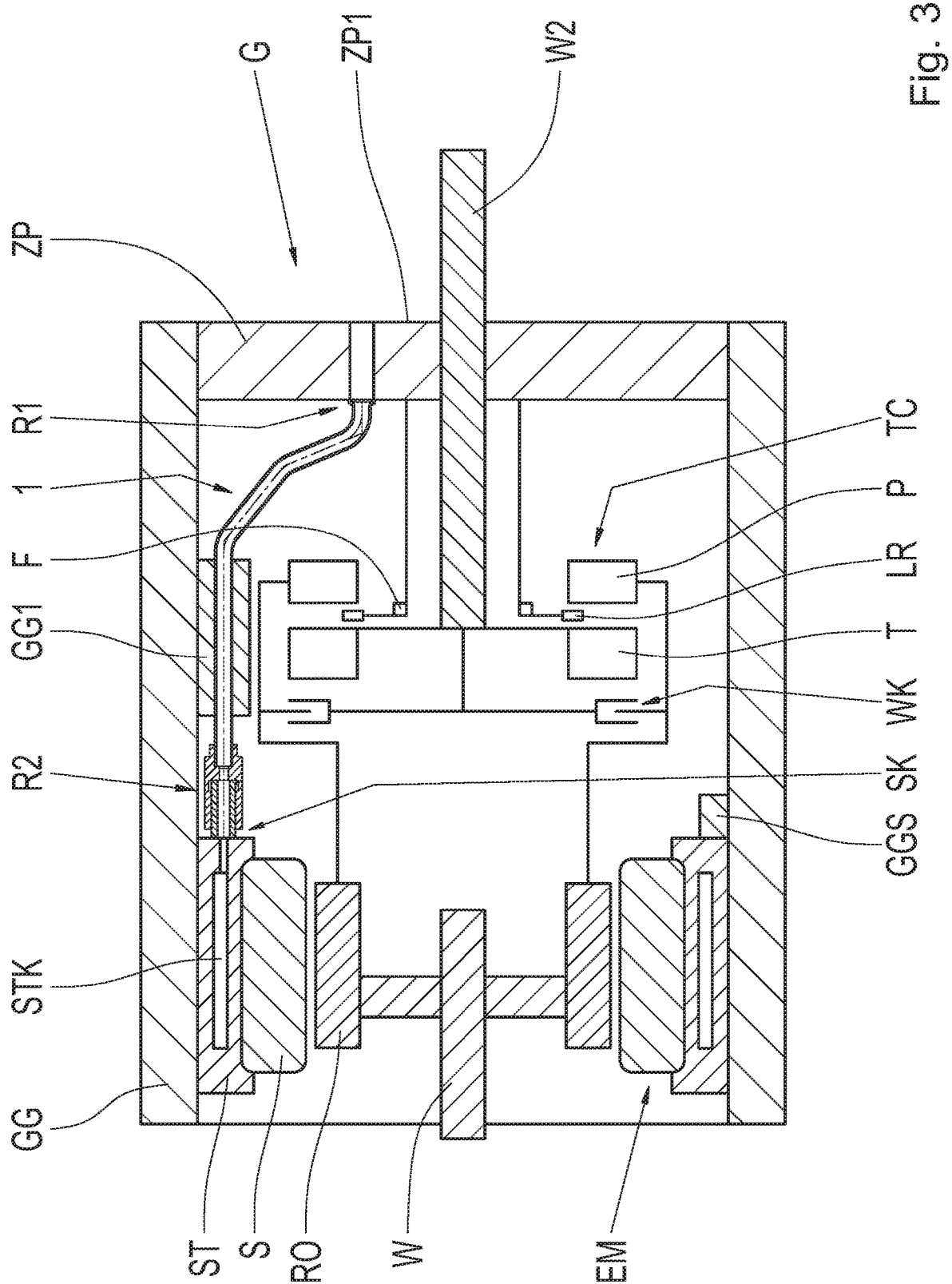
FIG. 3 shows a diagrammatic sectional view of a drive train unit including the piping.

FIG. 3 shows a diagrammatic sectional view of a drive train unit G including the piping 1. The drive train unit G can be, for example, an internal combustion engine, a hybrid module, a transmission, or an electrical axle drive. The exemplary embodiment according to the representation in FIG. 3 is a transmission. The drive train unit G includes a housing GG with a housing plate ZP secured thereon. An electric machine EM is arranged within the housing GG. The electric machine EM includes a stator S and a rotor RO. The rotor RO is connected to a shaft W. The stator S is surrounded, partially or in sections, by a stator carrier ST. The stator carrier ST includes a fluid duct STK, through which fluid can be directed in order to cool the stator S. The piping 1 is utilized for supplying fluid starting from the housing plate ZP to the fluid duct STK, wherein a fluid interface SK is provided between the stator carrier ST and the piping 1. The stator carrier ST is supported by a stop GGS at the housing GG. The first end R1 of the piping 1 is inserted into an opening ZP1 in the housing plate ZP. The stop R1A prevents the piping 1 from being inserted too far into the opening ZP1, so that the position of the piping 1 is defined.

The drive train unit includes a hydrodynamic torque converter TC. An impeller of the torque converter TC is connected to the rotor RO. A stator LR of the torque converter TC is connected to the housing plate ZP via a freewheel unit F. A turbine wheel T of the torque converter TC is connected to a shaft W2.

Moreover, a torque converter lockup clutch WK, which is configured for connecting the impeller P to the turbine wheel T, is associated with the torque converter TC. The piping 1 encompasses the torque converter TC at least partially or in sections, so that the piping 1 is arranged between the housing GG and the torque converter TC.

FIG. 4A through FIG. 4D show an installation sequence for securing the piping 1 in the drive train unit G. For the sake of greater clarity, no reference signs are provided in FIG. 4A through FIG. 4D; the reference signs in the following installation description relate to FIG. 3.

Figure 4A:
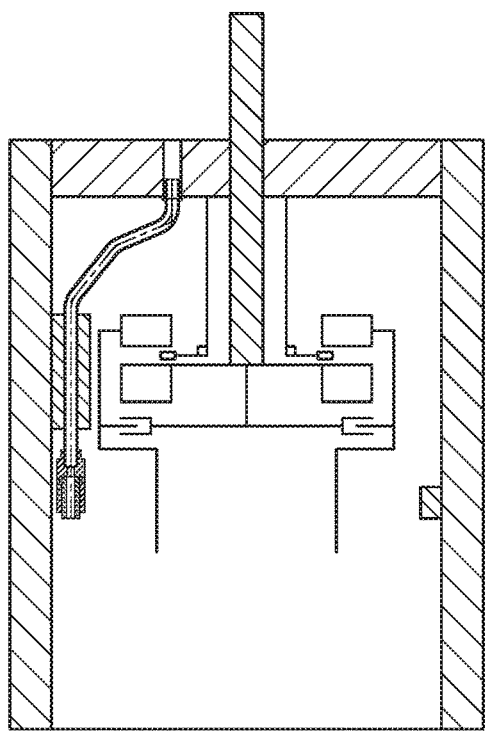
FIG. 4A through FIG. 4D show an installation sequence for securing the piping in the drive train unit.

FIG. 4A shows the initial installation of the piping 1 in the drive train unit G. For this purpose, the first end R1 of the piping 1 is inserted into the opening ZP1 of the housing plate ZP until the stop R1A acts against a stop surface provided at the housing plate ZP. The arrow represented in FIG. 4A illustrates the installation direction of the piping 1. A guide contour GG1 formed at the housing GG is utilized for positioning the piping 1 within the housing GG.

Figure 4B:
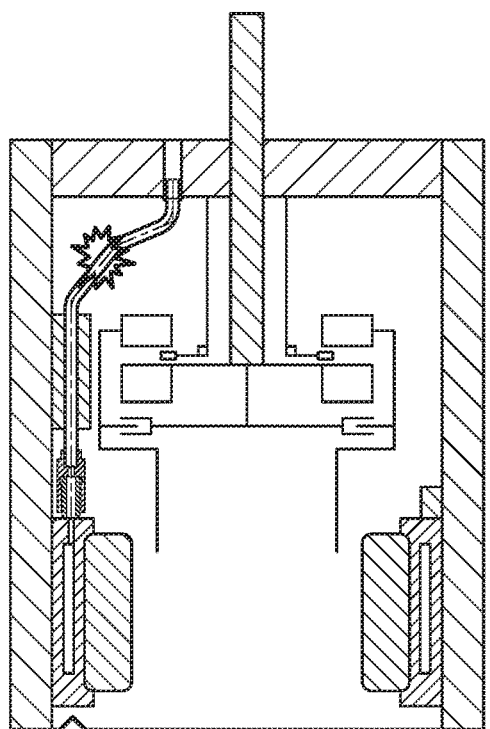

FIG. 4B shows the condition in which the piping 1 has been inserted, up to the stop 1A, into the opening ZP1 of the housing plate ZP. In addition, the torque converter TC was installed in the condition according to FIG. 4B.

Figure 4C:
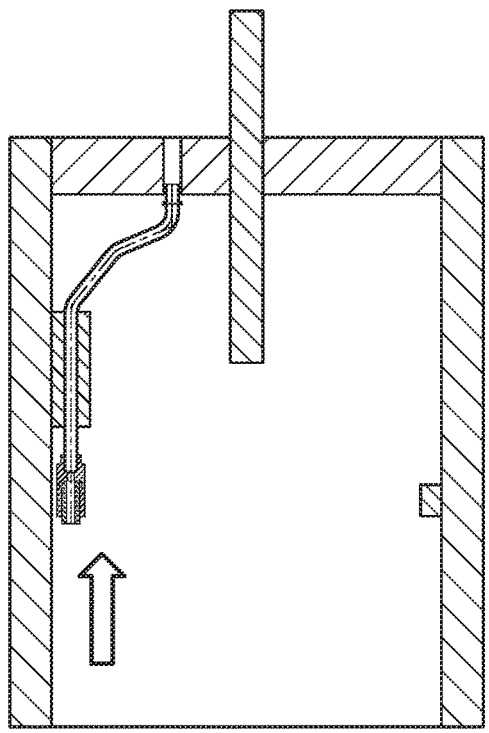

FIG. 4C shows the installation of the stator carrier ST, including the stator S, into the drive train unit G. The unit having the stator carrier ST and the stator S is inserted into the housing GG until the unit acts against the stop GGS. In the process, the stator carrier ST comes into contact with the sealing element R2D of the piping 1 at the fluid interface SK. The arrow represented in FIG. 4C illustrates the installation direction of the unit consisting of the stator carrier ST and the stator S.

Figure 4D:
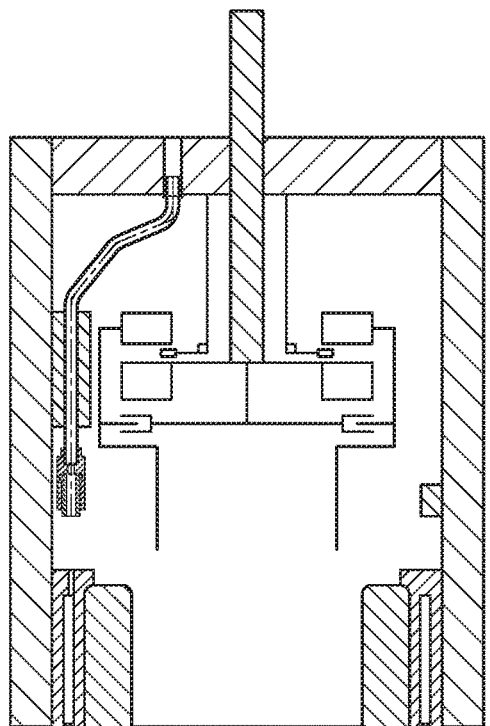

FIG. 4D shows the condition in which the stator carrier ST acts against the stop GGS. The sealing element R2D of the piping 1 has already come into contact with the stator carrier ST before this condition is reached. Due to the continuation of the insertion movement of the unit consisting of the stator carrier ST and the stator S until the stop GGS is reached, an elastic deformation of the piping 1 takes place. This deformation is symbolically represented in FIG. 4D. Due to this elastic deformation, the sealing element R2D of the piping 1 is pressed against the stator carrier ST, so that the sealing element R2D acting as a gasket obtains the sealing effect.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE SIGNS 1 piping
R pipe
R1 first end
R1A stop
R2 second end
R2D sealing element
R2DN protuberance
R2DF sealing surface
R2H seal holding element
R2HN groove
R2V assembly sleeve
G drive train unit
GG housing
GG1 guide contour
GGS stop
ZP housing plate
ZP1 opening
EM electric machine
S stator
ST stator carrier
STK fluid duct
SK fluid interface
RO rotor
W shaft
W2 shaft
TC torque converter
P impeller
T turbine wheel
LR stator
F freewheel unit
WK torque converter lockup clutch

The invention claimed is:

1. A piping (1) for guiding a fluid within a drive train unit (G) of a motor vehicle, comprising;
   a pipe (R) with a stop (R1A) formed at a first end (R1) of the piping (1); and
   a sealing element (R2D) provided at a second end (R2) of the piping (1),
   wherein the sealing element (R2D) acts as an axial seal, and the piping (1) is loaded along an extension direction of the piping (1) in order to elastically deform the piping (1) and axially press the sealing element (R2D) against a complementary surface.

2. The piping (1) of claim 1, wherein the sealing element (R2D) is secured at the second end (R2) of the piping (1) with a seal holding element (R2H), and the seal holding element (R2H) is secured at the pipe (R).

3. The piping (1) of claim 2, wherein the sealing element (R2D) is secured at the seal holding element (R2H) in a form-locking manner.

4. A piping (1) for guiding a fluid within a drive train unit (G) of a motor vehicle, comprising;
   a pipe (R) with a stop (R1A) formed at a first end (R1) of the piping (1); and
   a sealing element (R2D) provided at a second end (R2) of the piping (1),
   wherein the sealing element (R2D) acts as an axial seal, and the piping (1) is loaded along an extension direction of the piping (1) in order to improve a sealing effect of the sealing element (R2D), and
   wherein a radially outwardly directed groove (R2HN) is provided at an inner diameter of the seal holding element (R2H), radially outwardly directed protuberances (R2DN) are provided at the sealing element (R2D), and the protuberances (R2DN) and the groove (R2HN) cooperate in order to secure the sealing element (R2D) at the seal holding element (R2H).

5. The piping (1) of claim 1, wherein the pipe (R) is a metal pipe.

6. The piping (1) of claim 1, wherein the stop (R1A) is formed directly from material of the pipe (R).

7. The piping (1) of claim 1, wherein the stop (R1A) is formed by a local belling of the pipe (R).

8. The piping (1) of claim 1, wherein the pipe (R) is bent.

9. A drive train unit (G) for a motor vehicle, comprising the piping (1) of claim 1 for guiding a fluid within a housing (GG) of the drive train unit (G).

10. The drive train unit (G) of claim 9, wherein the drive train unit (G) is formed by an internal combustion engine, a hybrid module, a transmission, or an electrical axle drive.

11. The drive train unit (G) of claim 9, wherein the drive train unit (G) is formed by a transmission, and the piping (1) is arranged between the housing (GG) and a torque converter (TC) of the transmission.

12. A drive train unit (G) for a motor vehicle, comprising:
   a housing (GG); and
   a piping (1) for guiding a fluid within the housing (GG), the piping (1) comprising
      a pipe (R) with a stop (R1A) formed at a first end (R1) of the piping (1), and
      a sealing element (R2D) provided at a second end (R2) of the piping (1),
      wherein the sealing element (R2D) acts as an axial seal, and the piping (1) is loaded along an extension direction of the piping (1) in order to improve a sealing effect of the sealing element (R2D), and
      wherein the piping (1) is configured for guiding fluid starting from the housing (GG) or a housing plate (ZP) connected to the housing (GG) to a component (ST) of an electric machine (EM) arranged within the housing (GG).

13. The drive train unit (G) of claim 12, wherein the component (ST) of the electric machine (EM) is a stator carrier (ST).

14. A method for installing a piping (1) in a drive train unit (G) for guiding a fluid within a housing (GG) of the drive train unit (G), the piping (1) comprising a pipe (R) with a stop (R1A) formed at a first end (R1) of the piping (1) and a sealing element (R2D) provided at a second end (R2) of the piping (1), the sealing element (R2D) acting as an axial seal, the piping (1) loaded along an extension direction of the piping (1) in order to improve a sealing effect of the sealing element (R2D), the method comprising:

securing an end of the piping (1) on the housing side with respect to the housing (GG) by inserting the first end (R1) of the piping (1) into an opening (ZP1) on the housing side until the stop (R1A) at the first end (R1) of the pipe (R) acts against a stop surface on the housing side;

inserting a stator carrier (ST) of an electric machine (EM) into the housing (GG) such that a fluid interface (SK) of the stator carrier (ST) contacts the sealing element (R2D); and continuing the insertion movement of the stator carrier (ST) such that the piping (1) is elastically deformed.

\* \* \* \* \*